US008051330B2

(12) United States Patent
Cinato et al.

(10) Patent No.: US 8,051,330 B2
(45) Date of Patent: Nov. 1, 2011

(54) FAULT LOCATION IN TELECOMMUNICATIONS NETWORKS USING BAYESIAN NETWORKS

(75) Inventors: Carlo Cinato, Turin (IT); Andrea Pinnola, Turin (IT); Giuseppa Conte, Castelforte (IT)

(73) Assignee: Telecom Italia S.p.A., Milan (IT)

( * ) Notice: Subject to any disclaimer, the term of this patent is extended or adjusted under 35 U.S.C. 154(b) by 153 days.

(21) Appl. No.: 12/308,898

(22) PCT Filed: Jun. 30, 2006

(86) PCT No.: PCT/EP2006/006342
§ 371 (c)(1),
(2), (4) Date: Aug. 12, 2009

(87) PCT Pub. No.: WO2008/000290
PCT Pub. Date: Jan. 3, 2008

(65) Prior Publication Data
US 2009/0292948 A1    Nov. 26, 2009

(51) Int. Cl.
*G06F 11/00* (2006.01)
(52) U.S. Cl. .......................... 714/26; 714/48
(58) Field of Classification Search .............. 714/25, 714/26, 43, 44, 48; 709/224
See application file for complete search history.

(56) References Cited

U.S. PATENT DOCUMENTS

| | | | |
|---|---|---|---|
| 6,009,452 A | 12/1999 | Horvitz | |
| 6,076,083 A | 6/2000 | Baker | |
| 6,442,694 B1 | 8/2002 | Bergman et al. | |
| 6,487,677 B1 * | 11/2002 | Jantz et al. | 714/2 |
| 6,691,249 B1 * | 2/2004 | Barford et al. | 714/25 |
| 6,820,072 B1 * | 11/2004 | Skaanning et al. | 706/52 |
| 7,536,595 B1 * | 5/2009 | Hiltunen et al. | 714/26 |
| 2002/0019870 A1 | 2/2002 | Chirashnya et al. | |
| 2003/0126501 A1 * | 7/2003 | Musman | 714/26 |
| 2003/0204370 A1 * | 10/2003 | Yemini et al. | 702/183 |
| 2005/0160324 A1 * | 7/2005 | Przytula et al. | 714/43 |

FOREIGN PATENT DOCUMENTS

| | | |
|---|---|---|
| EP | 1 385 348 A1 | 1/2004 |
| WO | WO 2005/018249 A1 | 2/2005 |
| WO | WO 2007/003214 A1 | 1/2007 |

OTHER PUBLICATIONS

Neapolitan, "Learning Bayesian Networks", Prentice Hall, Chapter 3.2.2, ("Inference in singly connected networks"), 12 pages, (2004).
Chang, et al., "Bayesian Analysis for Fault Location in Homogeneous Distributed Systems", Reliable Distributed Systems, Proceedings, 12th Symposium on Princeton, N.J., IEEE Comput. Soc., pp. 44-53, (1993).

(Continued)

*Primary Examiner* — Robert Beausoliel, Jr.
*Assistant Examiner* — Elmira Mehrmanesh
(74) *Attorney, Agent, or Firm* — Finnegan, Henderson, Farabow, Garrett & Dunner, L.L.P.

(57) ABSTRACT

A method for locating a fault in a communication network, includes receiving status information relating to alarms, events, polled statuses or test results in the communication network; and locating the fault based on the received status information, wherein locating the fault includes identifying a limited region of the communication network in which the fault has occurred based on the received status information and on topological and functional information relating to network apparatuses that have generated the status information; constructing a probabilistic model relating faults and status information in the identified limited region of the communication network; and locating the fault based on the constructed probabilistic model and on status information received from the identified limited region of the communication network.

27 Claims, 4 Drawing Sheets

OTHER PUBLICATIONS

Steinder, et al., "Probabilistic Fault Localization in Communication Systems Using Belief Networks", IEEE/ACM Transactions on Networking, vol. 12, No. 5, pp. 809-822, (Oct. 2004).

Meira, "A Model for Alarm Correlation in Telecommunications Networks", PhD. Thesis in Computer Science, Federal University of Minas Gerais, pp. i-xx and 1-149, (Nov. 1997).

* cited by examiner

FAULT LOCATION IN TELECOMMUNICATIONS NETWORKS USING BAYESIAN NETWORKS

CROSS REFERENCE TO RELATED APPLICATION

This application is a national phase application based on PCT/EP2006/006342, filed Jun. 30, 2006.

TECHNICAL FIELD OF THE INVENTION

The present invention relates in general to telecommunications networks, and more particularly to fault location in telecommunications networks with distributed-agent or centralized fault management system by using Bayesian networks.

BACKGROUND ART

As is known, the latest-generation telecommunications networks and the services offered thereby, which are increasingly based upon the Internet protocol (IP), are a combination of technologies, network apparatuses and different functions (access, transport, control, service, content server), and in particular are composed of mutually interconnected apparatuses located at different protocol levels and using layering and client-server concepts for providing the network services to the customers. In this context, ensuring continuous provision of a service to customers, and preventing any problems that might be perceived by the customers, is one of the main tasks of an operator of telecommunications networks and services.

This task involves gathering and processing alarms arriving from the network apparatuses, suppressing alarms that are meaningless for the subsequent operations or that are redundant, automatically associating alarms generated by the same network resource (e.g. an operation re-establishment alarm with a related fault alarm), correlating received alarms relating to the same fault and generated by different apparatuses in the same or in a different domain (e.g. alarms received on transport apparatuses and alarms received on networking apparatuses), identifying faults in the network (supervision) based on the gathered alarms, identifying and analyzing the causes of the faults in a such a way as to arrive to the so-called "root cause" (diagnosis), assessing impact of the faults on the supported services, and finally undertaking all the actions necessary for repairing the faults (correction). By "fault" it is here meant an anomalous operating condition of a network apparatus or of one of its components due to an effective failure, whether hardware or software, or performance degradation thereof, that triggers alarms sent by the network apparatus or by other directly or indirectly interconnected apparatuses.

The problem of identifying the root cause based on the alarms is fundamental for creating an effective and automated fault management system. However, the capacity to aggregate alarms originated by different network apparatuses, to discriminate important information from redundant one and to identify the cause(s) of the faults is difficult to implement in an automated manner. Alarm correlation and fault identification are the most difficult to implement in an automated manner because it is fundamental the knowledge of the network apparatuses, in particular of the hardware architecture of the network apparatuses and the topological relationships between the various physical and logical components of both the network and the network services offered. The large numbers of network apparatuses, network resources, and their relationships is such that the management of asynchronous information, as alarms are, is extremely complex. The large number of cases that can be encountered also makes particularly critical maintenance and updating of the information (codes, rules and case tables) necessary to associate the alarms with one another and recognize the fault that generated them.

In the field of alarm correlation and root cause identification, a proposal has been made by Dilmar Malheiros Meira, "*A Model For Alarm Correlation in Telecommunications Networks*", November 1997, PhD. Thesis in Computer Science, Institute of Exact Sciences (ICEx) of the Federal University of Minas Gerais (UFMG). In particular, this thesis proposes a general model for telecommunications networks and, from this model, it proposes a model for alarm correlation in the network as a whole. The model is based on a principle named "recursive multifocal correlation" according to which a telecommunications network is partitioned into several sub-networks, each constituting a correlation focus. The breakdown of the problem into smaller sub-problems facilitates its solution and allows the use, in each sub-network, of the correlation technique most suitable to its peculiarities. The multifocal correlation principle may be recursively utilized in each sub-network until the network element level is reached. The concepts developed have been utilized in the implementation of a prototype, used for alarm correlation in a canonical telecommunications network. By utilizing a commercial product as a tool for the development and evaluation of Bayesian networks, the occurrence of alarms has been simulated and the functioning of the model has been verified, both concerning the identification of the possible causes for the received alarms (diagnostic inference), and the prediction of possible effects (predictive inference).

Space is also given in academic literature (see for example the article of M. Steinder and A. S. Sethi "*Probabilistic Fault Localization in Communication Systems Using Belief Networks*", IEEE/ACM Transactions on networking, vol. 12, No 5, October 2004) to applications of Bayesian networks, or Belief networks, which address the problem of alarm correlation by identifying the causality relationship between network faults and alarms, introduce probabilistic relationships between events, and make extensive use of the concept of conditioned probability.

The use in diagnostic systems of a Bayesian network model having link weights updated experientially is proposed in U.S. Pat. No. 6,076,083, which discloses an algorithm for easily quantifying the strength of links in a Bayesian network, a method for reducing the amount of data needed to automatically update the probability matrices of the network on the basis of experiential knowledge, and methods and algorithms for automatically collecting knowledge from experience and automatically updating the Bayesian network with the collected knowledge. A practical exemplary embodiment provides a trouble ticket fault management system for a communications network. In the exemplary embodiment, a communications network is represented as a Bayesian network where devices and communication links are represented as nodes in the Bayesian network. Faults in the communications network are identified and recorded in the form of a trouble ticket and one or more probable causes of the fault are given based on the Bayesian network calculations. When a fault is corrected, the trouble ticket is updated with the knowledge learned from correcting the fault. The updated trouble ticket information is used to automatically update the appropriate probability matrices in the Bayesian network.

OBJECT AND SUMMARY OF THE INVENTION

The Applicant has noticed that even though Bayesian-network-based techniques introduce an experience-learning step that allows the task of modeling the operating context to be simplified, those disclosed in academic documents are typically oriented to cases that, in terms of complexity, are limited, due to the difficulty of modeling complex scenarios by means of Bayesian networks. In particular, the Applicant has noticed that the documents from university sources concentrate mainly on the theoretical aspects of the use of Bayesian-network-based techniques and tools in fault management, so tending to circumscribe the analysis to simplified networks and non-Carrier Class networks, such as academic networks.

Additionally, the Applicant has noticed that the recursive multifocal alarm correlation proposed by Dilmar Malheiros Meira in "*A Model For Alarm Correlation in Telecommunications Networks*", is based on a so-called top-bottom approach according to which faults and alarms in the entire communication network are modeled by means of several probabilistic models, which are then iteratively partitioned into several probabilistic sub-models until the faulty network element is located based on the probabilistic sub-models. For each focus level the process responsible for the correlation applies a specific technique for that level and performs the correlation on one of the following two ways: waiting for the correlation of next level to perform its correlation, or getting known previous results of correlation of next level to perform its correlation. The correlation method at any level may be chosen from a group of correlation methods most suitable to its peculiarities, included Bayesian networks. At a given level, a Bayesian network is completely built based on information and topology of the network at the given level.

On the other hand, the Applicant has noticed that the learning procedure proposed in U.S. Pat. No. 6,076,083 has been conceived to reduce the amount of necessary experimental (i.e. in-field) information and hence it produces significant effects in large-scale Bayesian networks only, which are generally used to solve diagnostic problems.

The objective of the present invention is to provide a solution that in general simplifies the problem of managing faults in telecommunications networks with different overlaid multiple transmission protocol levels and composed of any type of apparatuses, so that the resultant algorithm can be processed in a simple and rapid manner, thereby being able to operate in real time on a large-scale network. In particular, a solution is sought that is able to manage faults in telecommunications networks by means of a small-scale probabilistic model, in particular small-scale Bayesian networks, thus simplifying the Bayesian network state learning and maintenance procedures and the amount of information necessary during the learning procedure.

This objective is achieved by the present invention in that it relates to a method, a system and a software product for locating faults in a communication network, as defined in the appended claims.

The Applicant has found that the aforementioned objective can be achieved by making use of Bayesian Networks directly at the apparatus level, so that the Bayesian Networks can be built in real time based on the received alarms and on conditioned probabilities and relationships between cause and effect states. The Bayesian Networks can be built by aggregating partial Bayesian networks built in contiguous portions of the network. In particular, the present invention finds a particular advantageous application in distributed-agents networks, wherein the partial Bayesian networks can be built by different autonomous agents based on the received alarms, and the partial Bayesian networks are then joined together by an Accountable Agent in order to generate a complete Bayesian network of a limited network region where the fault is confined. The invention can be applied as well in centralized or partially-distributed network architectures.

Moreover, the present invention can be applied as well for monitoring of other types of networks, such as for example power distribution networks, medical instruments networks, and in general to any network of apparatuses functionally connected, as in an industrial plant or in a nuclear reactor.

Use of Bayesian networks allow the association between causes and effects to be managed in a probabilistic manner, and, by means of a concise representation of the monitored domain, a decision to be made inside environments characterized by a probabilistic knowledge of the monitored domain. In particular, Bayesian networks allow computation of the probability that, based on a set of alarms collected by the management system, the cause is to be associated with a certain fault in a resource, leading to the identification of the cause, intended as that with the greatest probability to have generated the alarm and derived from statistical inference. In support of this information, the Bayesian networks allow the most likely cause to be computed or the most effective test to be identified that could be made on the network in the specific situation, in order to identify the root cause.

In particular, contrary to what proposed by Dilmar Malheiros Meira in "*A Model For Alarm Correlation in Telecommunications Networks*", where the faulty network element is located based on probabilistic sub-models obtained by recursively partitioning several probabilistic models of the entire communication network, in the present invention a limited region of the communication network in which the fault has occurred is firstly identified based on the received alarms and on topological and functional information relating to network apparatuses that have generated the alarms (i.e., identification is made directly at the apparatus level), a probabilistic model relating faults and alarms in the identified limited region of the communication network is then constructed, and finally the fault is located based on the constructed probabilistic model and on alarms received from the identified limited region of the communication network.

The use of Bayesian networks allow the following three advantages to be achieved:
  as an observation-based fault identification operation is intrinsically probabilistic, management of the problem in terms of probability computation allows to rapidly assess possible causes of the problem and to weight the probability that the problem arises during operation;
  as the observations, for various reasons, might not reach the management system, Bayesian networks allow the fault probabilities to be computed in a transparent manner even when information is missing; and
  Bayesian networks also allow the probabilities assigned to the various events to be recomputed automatically (for example at predetermined intervals of times) and on the basis of experience acquired during their use, thus allowing them to adapt themselves to the network's evolution without this entailing anomalous operations in dealing with cases already contemplated by the system.

Additionally, the present invention provides for the construction of a Bayesian network modeling the telecommunications network only in a localized, limited region of around the fault that has occurred and disregarding areas of the telecommunications network physically or logically far from the fault, thus simplifying learning and maintenance of the states of the Bayesian Network and reducing the amount of information necessary for the learning step.

The present invention thus relates to a method for locating a fault in a network, in particular in a communication network, comprising the following steps, performed in the indicated sequence:
receiving status information relating to at least an alarm, an event, a polled status or a test result in the communication network;
identifying a limited region of the communication network in which the fault has occurred based on the received status information;
constructing a probabilistic model relating possible faults and status information in the identified limited region; and
locating the fault based on the constructed probabilistic model and on the received status information.

The probabilistic model is advantageously represented by a Bayesian Network.

The identified limited region is at the apparatus level, in particular it consists of a network apparatus (the faulty apparatus) and the network apparatuses and resources physically or logically contiguous thereto.

Identifying the limited region is preferably based also on topological and functional information relating to network apparatuses that have generated the status information.

Constructing a probabilistic model may include:
for each possible fault in the identified limited region, determining a first probability that a status information is generated when the fault occurs (effect/cause probability);
for each possible status information in the identified limited region, determining a second probability that the status information is generated when no fault occurs in the identified limited region (effect/no_cause probability); and
constructing the probabilistic model relating faults and status information in the identified limited region based on the determined first and second probabilities.

Determining first probabilities may include:
identifying the first (effect/cause) probabilities associated with the status information received;
identifying the first probabilities associated with first faults that could have generated the status information received;
identifying the first probabilities associated with additional status information that could have been generated when the first faults occur; and
identifying the first probabilities associated with second faults that could have generated the additional status information received.

Moreover, determining first probabilities may further include:
repeating identifying the first probabilities associated with additional status information that could have been generated when the first faults occur, and identifying the first probabilities associated with second faults that could have generated the additional status information received, until no further first probability is identified.

Constructing a probabilistic model may further include:
for each individual possible fault in the identified limited region, determining a third probability that the individual possible fault occurs in the identified limited region (cause probability).

Moreover, constructing a probabilistic model may further include:
determining fourth probabilities that given status information is generated when given multiple faults occur within the identified limited region.

The fourth probabilities may be determined based on the first probabilities that the given status information is generated when the corresponding individual faults occur.

Locating the fault may further include:
inferring the fault location based on the probabilistic model and on status information received from the identified limited region of the communication network.

Identifying the limited region preferably includes:
identifying an accountable network resource responsible for the management of the fault;
identifying at least one network resource physically or logically contiguous to the accountable network resource; and
identifying at least one network resource physically or logically interconnecting the accountable network resource and the contiguous network resource.

Preferably, the communication network is a distributed-agent communication network including a number of network resources each managed by an agent. The above process is therefore preferably managed at the agent level.

In particular, identifying the limited region preferably includes:
identifying an accountable agent associated with the accountable network resource; and
identifying at least one contiguous agent associated with the accountable network resource.

Moreover, identifying an accountable agent includes:
identifying the agent having the most information relating to the fault in the limited region.

Identifying at least one network resource physically or logically contiguous to the accountable network resource may include:
identifying the network resource which is physically or logically contiguous to the accountable network resource and whose agent have information relating to the fault in the limited region useful for the fault identification.

Constructing the probabilistic model may further include:
constructing by the accountable agent a partial probabilistic model relating status information received by the accountable agent and faults occurred in the accountable network resource, in the contiguous network resource and in the interconnection resource;
constructing by the contiguous agent a partial probabilistic model relating status information received by the contiguous agent and faults occurred in the accountable network resource, in the contiguous network resource and in the interconnection resource; and
constructing by the accountable agent the probabilistic model relating faults and status information in the identified limited region based on the partial probabilistic models constructed by the accountable agent and the contiguous agent.

Constructing the probabilistic model preferably includes:
combining the partial probabilistic models constructed by the accountable agent and the contiguous agent.

Constructing a partial probabilistic model by an agent may include:
for each individual possible fault in the accountable network resource, in the contiguous network resource and in the interconnection resource, determining a first probability that a status information is generated when the individual fault occurs (effect/cause probability);

for each status information that may be generated by the network resource managed by the agent, determining a second probability that the status information is generated when no fault occurs in the network resource managed by the agent (effect/no_cause probability); and constructing the partial probabilistic model based on the determined first and second probabilities.

Determining first probabilities may include:

identifying the first probabilities associated with the status information received by the agent;

identifying the first probabilities associated with first faults that could have generated the status information received by the agent;

identifying the first probabilities associated with additional status information that could have been generated when the first faults occur; and identifying the first probabilities associated with second faults that could have generated the additional status information received by the agent.

Determining first probabilities may further include:

repeating identifying the first probabilities associated with additional status information that could have been generated when the first faults occur, and identifying the first probabilities associated with second faults that could have generated the additional status information received by the agent, until no further first probability is identified.

Constructing a partial probabilistic model by an agent may further include:

for each individual possible fault in network resource managed by the agent, determining a third probability that the individual fault occurs in the in network resource managed by the agent.

Moreover, constructing a partial probabilistic model by an agent may further include:

determining fourth probabilities that given status information is generated when given multiple faults occur in network resource managed by the agent.

Determining fourth probabilities that given status information is generated when given multiple faults occur in network resource managed by the agent may include:

determining the fourth probabilities based on the first probabilities that the status information is generated when the corresponding individual faults occur in network resource managed by the agent.

The present invention also relates to a system for locating a fault in a communication network, configured to perform the method previously described. In particular, the communication network is preferably a distributed-agent communication network including a number of network resources each managed by an agent, the agents being configured to perform the method previously described.

The present invention further relates to a software product which can be loaded into the memory of a fault locating system in a communication network and includes software-code portions for performing, when the computer program product is run on the fault processing system, the method previously described.

Finally, the present invention relates to a method for constructing a probabilistic model relating faults and status information in a communication network for use in locating a fault in the communication network, as previously described.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

In general the present invention is applicable to any type of telecommunications network in which the network apparatuses are able to signal the presence of faults to an external system via alarm messages or status changes. For example, the invention is applicable to networks for the supply of xDSL and VoIP services and Next Generation Network architectures, where the different network segments are distinct: Access Network, Transport Network (where the transport consists of IP BackBone nodes on a layer of SDH transmissive nodes), Service Control, and Service and Data Servers.

Additionally, the present invention may in general be applied to telecommunications networks with both centralized and distributed-agent fault management systems, where the agents may be distributed in a one-to-one relationship with the network apparatuses, or be semi-distributed or partially centralized. However, the present invention has proved to be particularly advantageous in a distributed-agent fault management system, such as that described in the co-pending application PCT/EP2005/007298 filed on Jul. 6, 2005 by the present Applicant. In this context, in fact, a Bayesian network may be constructed from information distributed over the various agents involved in the fault, thus allowing management of the information necessary to search for the root cause in a distributed manner, so that each agent can keep the information up-to-date and provide it upon request to a user.

Therefore, for descriptive simplicity and without loss of generality, the present invention will now be described with reference to a telecommunications network with a distributed-agent fault management system, such as the NGOSS (New Generation Operations Systems and Software) architecture described for example in WO2005/018249 in the name of the present Applicant.

Figure 1:
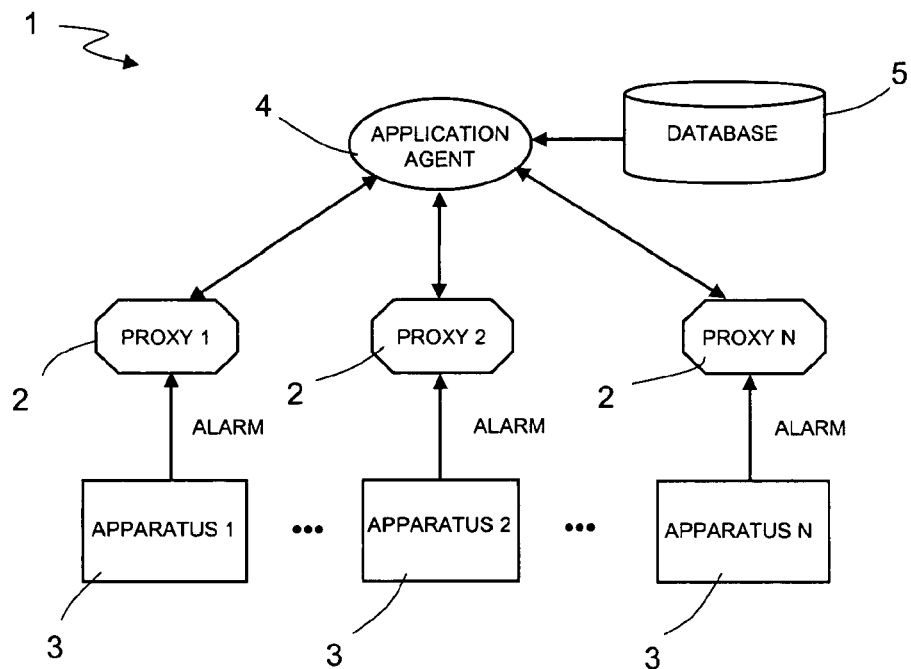
FIG. 1 shows a block diagram of a distributed-agent fault management system.

FIG. 1 shows a block diagram of part of a telecommunication system including a telecommunication network TN and a network management platform MP (separated by a dashed line in the schematic representation). The telecommunication network TN comprises a plurality of network apparatuses 3 of different types. The network management platform MP comprises a distributed-agent fault management system 1 including low-logic-level apparatus management software applications, such as Proxies, hereinafter referred to as Autonomous Agents 2, which are univocally associated with the network apparatuses 3 in a one-to-one relationship, and are configured to manage them.

Autonomous Agents 2 have the capability to process and store data, and communicate with each other via asynchronous messages and with modalities and interdependencies that are independent of the topology of the network apparatuses, where by network apparatus it is meant a managed network element able to send alarms as a consequence of faults and, if possible, of being queried by the Autonomous Agent to provide information on its operating state.

The network apparatuses managed by the Autonomous Agents are physically interconnected to each other and have established with each other peer, client and/or server relationships that normally exist in telecommunications networks.

A higher-logic-level apparatus management software application, hereinafter referred to as Application Agent 4, is provided to manage and store in a database, designated by 5, the centralized information relating to the Autonomous Agents associated with the network apparatuses, to gather statistical data from the individual Autonomous Agents, to process the gathered data, and to provide information to the Autonomous Agents upon request.

Although only one Application Agent 4 has been illustrated for the sake of simplicity, the network management platform MP typically comprises a plurality of Application Agents 4, each associated with a respective group of Autonomous Agents 2. The network management platform MP may further include a centralized entity, called Manager Application (not shown), which coordinates and manages the different Application Agents 4.

Identification of operating faults in the telecommunications network is achieved through distributed processing carried out by the Autonomous Agents. Each Autonomous Agent is configured to host and run a software application that models the corresponding network apparatus, to store the set of relationships of the managed network apparatus with the surrounding network domain, and to actively interoperate with the other Autonomous Agents through the exchange of messages.

Figure 2:
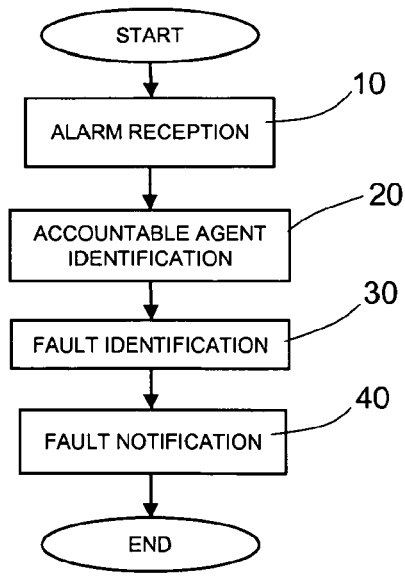
FIG. 2 shows a general flowchart of a fault identification procedure.

FIG. 2 shows a general flowchart of a fault identification procedure according to the present invention.

Initially, each Autonomous Agent collects all the reports sent by the network apparatus it manages, including alarms spontaneously generated by the network apparatus or status changes detected by the polling system, which constantly checks the value of certain indicators on the network apparatus and generates and sends reports to the Autonomous Agent (block 10). This function also includes filtering the received alarms, such as by oscillation filtering, persistence filtering, etc. The received reports are stored in the Autonomous Agent's memory for subsequent use.

Then, each Autonomous Agent groups the collected alarms or status changes based on information about the network apparatus that has sent the alarm or changed the status, the type of fault, and the time when the alarm was generated or the status change was notified. The fault management system 1 then identifies, via a distributed algorithm, and then elects, among all of the Autonomous Agents that have received alarms or status changes from correlated network apparatuses, an Autonomous Agent, hereinafter referred to as Accountable Agent, responsible for the fault and having the most information about the fault in question necessary to perform the successive fault identification step (block 20). The Accountable Agent is the Autonomous Agent that manages the network apparatus on which the fault has occurred or, in the worst case, a network apparatus which is physically or logically contiguous thereto, i.e. which is directly connected to the faulty apparatus via a communication link or which is at the same communication protocol level as the faulty apparatus and is connected thereto via a lower-level communication protocol apparatus. A method to identify and elect the Accountable Agent is for example described in the aforementioned co-pending application PCT/EP2005/007298 in the name of the present Applicant.

Then, the Accountable Agent identifies the fault position based on information in its possession and, if necessary, on information in possession of Autonomous Agents, hereinafter referred to as Contiguous Agents, which are physically or logically (i.e., at the communication protocol level) contiguous to the Accountable Agent and which are in possession of useful information for the fault identification (block 30). A Contiguous Agent might not be involved in the fault.

In particular, the fault identification is carried out based on the following minimum information:

identifiers of the Accountable Agent and the corresponding Contiguous Agents for the network apparatus that has sent the alarm or has the status changed;

alarms received by the Accountable Agent, or status changes notified to the Accountable Agent;

alarms received by the Contiguous Agents, or status changes notified to the Contiguous Agents; and topological information that links resources (i.e., physical units such as ports, cards, memory unit, central processing unit, etc., or logical units such as routing protocol, logic connections, etc.) on the network apparatus managed by the Accountable Agent to resources on the network apparatuses managed by the Contiguous Agents.

Based on the above-listed information and using internal information regarding the behavior of the network apparatuses in cases of fault, the Accountable Agent locates the fault, namely identifies the faulty resource.

Finally, the information about the identified fault is displayed to an operator (fault notification) through a human-machine interface (HMI) directly implemented by the Accountable Agent or indirectly through a server (block 40). The information provided to the operator includes at least the following:

the Accountable Agent identifier;

the faulty resource identifier;

the timestamp (date and time) information.

Figure 3:
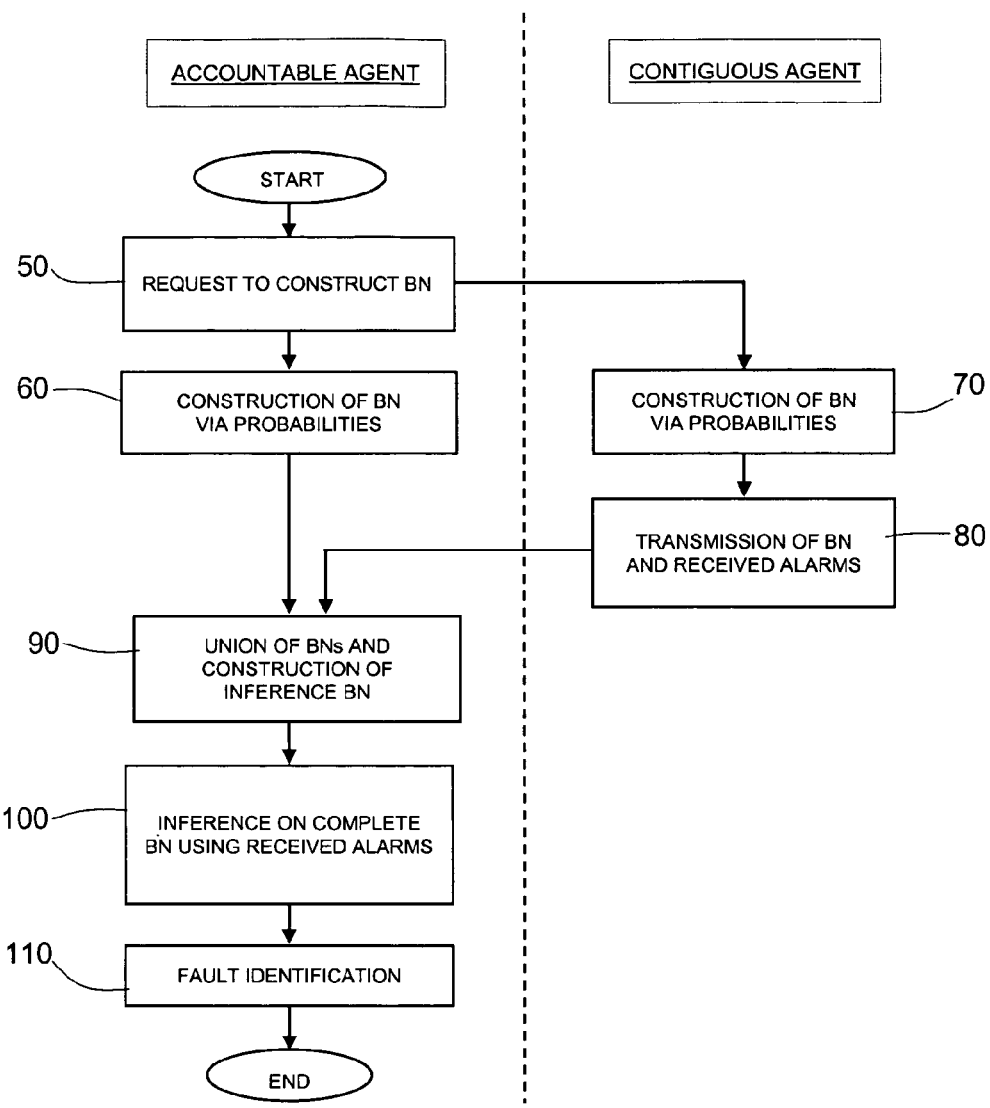
FIG. 3 shows a detailed flowchart of a fault identification step of the fault identification procedure.

FIG. 3 shows a more detailed flowchart of the fault identification step previously described with reference to block 30. In particular, the present invention proposes an algorithm based on distributed-agent processing via the construction of a Bayesian Network of the faulty resource. The Bayesian Network is constructed and managed by the Accountable Agent (identified in step 20) starting from single portions of the Bayesian Network distributed among the same Accountable Agent and Contiguous Agents. The master of the distributed fault identification algorithm is the Accountable Agent, which will take care of controlling the operations of the Contiguous Agents. The proposed method for the management and aggregation of the information allows the complexity of the problem to be significantly reduced with respect to traditional methods, whilst at the same time exploiting the typical capacity of Bayesian networks to adapt to changing conditions.

After identification of the Accountable Agent, the fault management system 1 is assumed to be in the situation of having identified a very limited region of the network in which the fault has occurred. This limited region includes the network apparatus managed by the Accountable Agent, network apparatuses managed by Contiguous Agents, and resources (i.e., including one or more apparatuses and/or links), hereinafter referred to as Silent Resource, which physically or logically interconnect the network apparatus managed by the Accountable Agent with the network apparatuses managed by the Contiguous Agents, and which are not able to send alarms as a consequence of faults (i.e., it might be affected by a failure, but does not send alarms) or cannot expose status information. An algorithm capable of identifying the fault position with such a precision is for example disclosed in the aforementioned co-pending application PCT/EP2005/007298 in the name of the present Applicant. It may be immediately appreciated that any other algorithm able to identify the fault position with such a precision may be used as well.

Once the Accountable Agent has been identified, the possible fault may belong to one of the following two categories:
  internal fault: the fault regards a resource which belongs to the network apparatus which is managed by the Accountable Agent and which does not have communication functions, such as a computer fan;
  contiguous fault: the fault can be on one of the following three resources:
    resources of the network apparatus managed by the Accountable Agent and which can communicate with a network apparatus managed by a Contiguous Agent;
    silent resources; and
    resources of a network apparatus managed by a Contiguous Agent and which can communicate with the network apparatus managed by the Accountable Agent.

More in detail, with reference to FIG. 3, after the Autonomous Agents have received alarms or polled status changes from the network apparatuses and the fault management system 1 has identified the Accountable Agent and the Contiguous Agents, the Accountable Agent sends a request to construct a Bayesian Network to the Contiguous Agent(s) connected to the Accountable Agent via an alarmed resource (block 50).

Then, the Accountable Agent constructs its own partial Bayesian Network (block 60) and each Contiguous Agent that has received the request sent by the Accountable Agent constructs its own partial Bayesian Network (block 70). The partial Bayesian Network of the Accountable Agent relates to the faults in the network apparatuses managed by the Accountable Agent and by the Contiguous Agents and in the corresponding Silent Resources, and to the alarms received by the Accountable Agent and/or the status changes notified to the Accountable Agent. The partial Bayesian Network of a Contiguous Agent relates to the faults in the network apparatuses managed by the Accountable Agent and by the Contiguous Agents and in the corresponding Silent Resources, and to the alarms received by the Contiguous Agent and/or the status changes notified to the Contiguous Agent.

In particular, the Accountable Agent and the Contiguous Agents construct their own partial Bayesian Networks based on information contained in a basic component described in detail further on, and then each Contiguous Agent sends to the Accountable Agent its own partial Bayesian Network and the alarms and status changes received from the network apparatus managed thereby (block 80).

Then the Accountable Agent constructs a complete Bayesian Network, hereinafter referred to as Inference Bayesian Network, based on, and in particular by combining, its own partial Bayesian Network and the partial Bayesian Networks received from the Contiguous Agents, as described in detail further on (block 90), which Inference Bayesian Network is maintained by the Accountable Agent and regards faults on the network apparatus managed by the Accountable Agent, on the Silent Resource, and on the network apparatuses managed by the Contiguous Agents, and alarms collected by, and/or status changes notified to, the Accountable and the Contiguous Agents.

Finally, the Accountable Agent performs an inference process on the complete Bayesian Network (of the considered limited network region) using the information of those alarms that have been received by, and/or status changes that have been notified to, the Accountable Agent and the Contiguous Agent(s) as input data to the Inference Bayesian Network (block 100), thus identifying the fault (block 110). In particular, starting from the complete Bayesian Network and from the alarms received by the Accountable and Contiguous Agents and/or the status changes notified thereto, the inference process allows computing the probability of each possible cause. In principle any method proposed in literature may be suitable for this purpose. For example, the method disclosed by Neapolitan in "*Learning Bayesian networks*", Prentice Hall, 2004, chapter 3.2.2 ("Inference in singly connected networks") may be used for carrying out the inference process on the Inference Bayesian Network.

Figure 4:
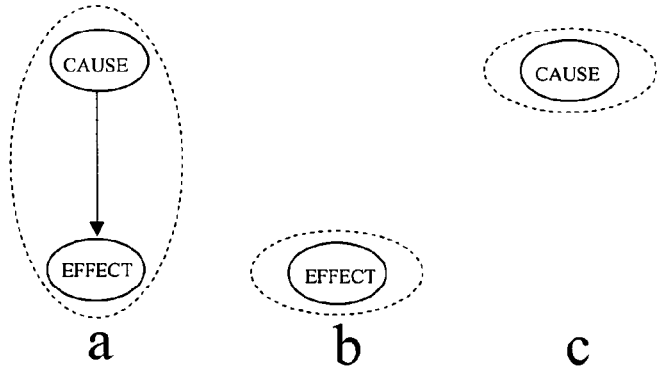
FIGS. 4a, 4b and 4c show respectively schematic representations of basic components used to construct a Bayesian Network.

With regard to probabilities, FIG. 4 shows schematic representations of three different conditional probabilities of single effects related to faults, which may be regarded as the atoms constituting a Bayesian Network:
  conditional probability of a single effect given a single cause, i.e., the probability that the effect is present or generated when the cause occurs; such probability will be hereinafter called "effect/cause probability";
  conditional probability of an effect given no cause, i.e., the probability that the effect is present or generated when no cause occurs; such probability will be hereinafter called "effect/no_cause probability"; and
  probability of a single cause, i.e., the probability that the cause is present or generated such probability will be hereinafter called "cause probability".

These probabilities are kept up-to-date with respect to the effective behavior of the resources and apparatuses in operation.

For the purposes of the present invention, term "cause" will hereinafter identify a fault, while term "effect" will hereinafter identify an alarm, an event, a polled status or a test result. Accordingly, an effect will be considered as present if, respectively, the alarm is present, the event occurs, the polled status is detected or the test result is obtained.

Designated by "a" in FIG. 4 is a schematic representation of a conditional probability of an effect given a single cause (cause/effect probability). This probability is typified by the following information: the resource originating the cause (CauseResource), the type of cause (Cause), the resource that generates the effect (EffectResource) and the type of effect (Effect). The resource originating the cause and the resource generating the effect can be different, as in the case where a fault is detected by a resource that is remote with respect to the fault.

Designated by "b" in FIG. 4 is a schematic representation of a conditional probability of an effect given no cause (effect/no_cause probability). This probability is typified by the following information: the resource that generates the effect (EffectResource) and the type of effect (Effect).

Designated by "c" in FIG. 4 is a schematic representation of probability of a single cause (cause probability). This probability is typified by the following information: the resource originating the cause (CauseResource) and the type of cause (Cause).

Information concerning the above probabilities are stored in database 5 in FIG. 1, hereinafter referred to as Probability Database (PD), which can be maintained on an Application Agent and managed in a centralized manner or on the Autonomous Agents and managed in a distributed manner.

The Accountable Agent, as well as each Contiguous Agent to which an explicit request to construct its Bayesian Network has been made by the Accountable Agent, constructs its own partial Bayesian Network based on the above probabilities, on the effects that it has received and the resources of the network apparatus managed thereby. For the sake of simplicity, in the following description there will be considered a scenario where only one Contiguous Agent and a Silent Resource are involved, in addition to the Accountable Agent, in the construction of the Inference Bayesian Network.

For this operation, each Agent acts independently of the others, determining the following information:
- effects sent to the Agent by the associated network apparatus or polled on the network apparatus by the Agent itself;
- knowledge of equipment and topology concerning the resources involved by effects, the resources of network apparatuses interconnected via the resource involved by effects and the interconnection resources concerned;
- for each single cause related to the resources of the network apparatus managed by the Agent and involved by an effect, to the Silent Resources and the resources of the Contiguous Agent, and to the effects that could be sent by or polled on the managed device, an effect/cause conditional probability. In particular, for the Accountable Agent the aforementioned conditional probabilities are those related, as a cause, to the involved resources with CauseResource identical either to a resource of the network apparatus managed by the Accountable Agent, or to the Silent Resource via which the Accountable Agent is interconnected to the Contiguous Agents, or to the resources of the network apparatus managed by the Contiguous Agents and, as an effect, to the effect detected on the equipment managed by the Accountable Agent; similarly, for a Contiguous Agent the aforementioned conditional probabilities are those related, as a cause, to the involved resources with CauseResource identical either to a resource of the network apparatus managed by the Contiguous Agent, or to the Silent Resource via which the Contiguous Agent is interconnected to the Accountable Agent, or to the resources of the network apparatus managed by the Accountable Agent and, as an effect, to the effect detected on the equipment managed by the Contiguous Agent;
- for each effect that may be generated in the area of competence of the Agent qual'è l'area di competenza?) and related to effects that could be generated by the network apparatus managed by the Agent, an effect/no_cause conditional probability; and
- for each single cause that may occur in the area of competence of the Agent qual'è l'area di competenza?), a cause probability that the single cause occurs in resources of the network apparatus managed by the Agent and which are involved by the effects. For the Accountable Agent, the cause probabilities that the single causes occur in the Silent Resource are also considered.

Based on the preceding information, the first operation performed separately by the Accountable Agent and by the (or each) Contiguous Agent is the formation of a particular group of probabilities, hereinafter referred to as Useful Probability Group.

All the effect/cause conditional probabilities are considered and for each effect effectively detected by the Agent there are then identified those with an EffectResource-Effect pair corresponding to the resource involved by the effect and to the raised effect. The identified conditional probabilities are then added to the Useful Probability Group of the Agent. Each of the added conditional probabilities will have a corresponding CauseResource-Cause pair.

All the effect/cause conditional probabilities are then considered again and there are identified those with a CauseResource-Cause pair corresponding to a CauseResource-Cause pair in the Useful Probability Group. The identified conditional probabilities are then added to the Useful Probability Group of the Agent, if not already therein. Each of the added conditional probabilities will have a corresponding EffectResource-Effect pair.

All the effect/cause conditional probabilities are considered again and there are identified those with an EffectResource-Effect pair corresponding to an EffectResource-Effect pair in the Useful Probability Group. The identified conditional probabilities are then added to the Useful Probability Group, if not already therein.

The last two steps are then repeated until no new conditional probability is added to the Useful Probability Group, and at this point the procedure is terminated.

Formation of the Useful Probability Group is finally completed by adding all effect/no_cause conditional probabilities that have EffectResource-Effect pairs equal to the EffectResource-Effect pairs of conditional probabilities already contained in the Useful Probability Group.

Based on the Useful Probability Groups, corresponding individual partial Bayesian Networks are then constructed by the Accountable Agent and by each Contiguous Agent, respectively.

Finally, each Contiguous Agent sends to the Accountable Agent its individual partial Bayesian Network, and the Accountable Agent builds the Inference Bayesian Network based on the its individual partial Bayesian Network and the individual partial Bayesian networks built by the Contiguous Agents. In particular, by construction, the individual partial Bayesian Networks may have identical cause states, while the effect states are disjoint sets. In this way, the Inference Bayesian Network is constructed via the overlaying of the two individual partial Bayesian Networks, obtained by pooling the cause states and keeping the relationships between causes and effects. After the overlaying, the Accountable Agent associates the cause states with corresponding probabilities of single cause. Probability Tables associated to the effect states are then computed as hereinafter depicted using the effect/cause conditional probabilities and the effect/no_cause conditional probabilities in the Useful Probability Group.

Figure 5A:
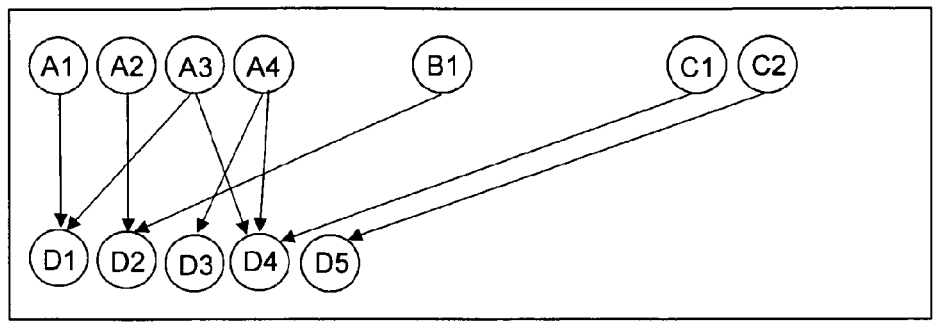
FIGS. 5a, 5b and 5c show respectively schematic representations of two partial Bayesian Networks and a complete Bayesian Network.
Figure 5B:
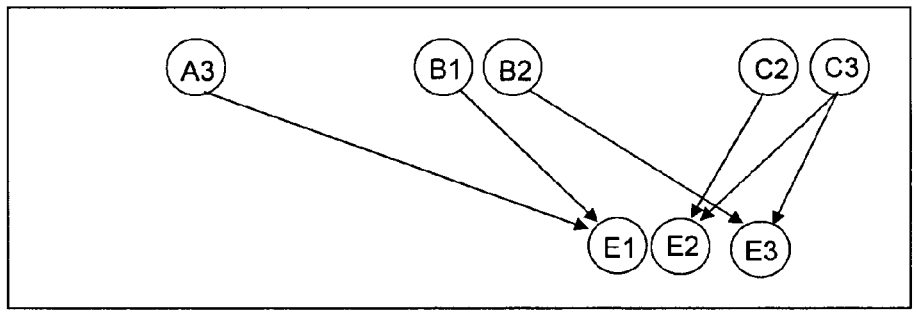
Figure 5C:
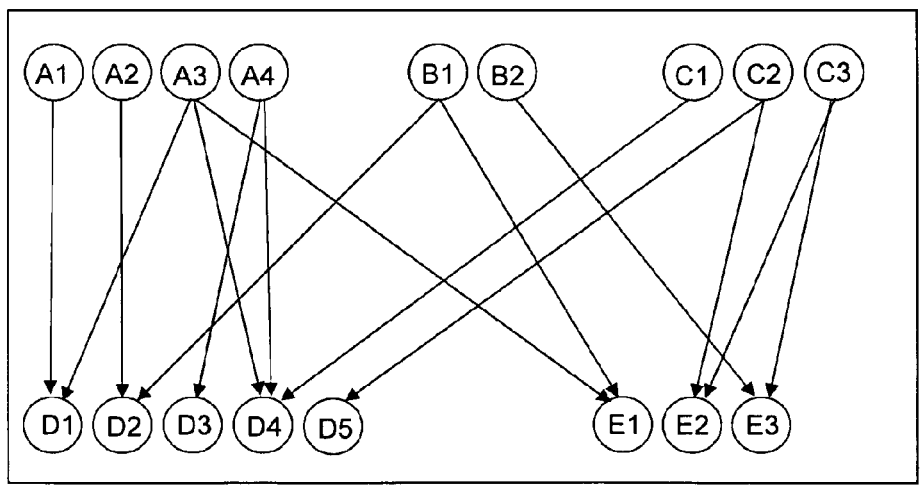

In particular, each resulting partial Bayesian Network will be a sort of "bipartite causality graph" network of the type shown in FIGS. 5a, 5b and 5c, where the cause state level, represented by the CauseResource-Cause pairs, are depicted at the top, and the effect state level, represented by the EffectResource-Effect pairs, are depicted at the bottom. In particular, each circle at the top represents a cause state identified by a CauseResource-Cause pair and each circle at the bottom represents an effect state identified by an EffectResource-Effect pair. Cause states and effect states are connected by network arcs, oriented from the cause states to the effect states.

The cause states that must be present in the Bayesian Network for a given configuration of effects are all the CauseResource-Cause pairs in the Useful Probability Group constructed for the raised effects, and the effect states that must be present in the Bayesian Network for a given configuration of raised effects are all the EffectResource-Effect pairs in the Useful Probability Group constructed for the raised effects, as previously described.

The existence of an effect/cause conditional probability implies a dependency between the CauseResource-Cause pair and the EffectResource-Effect pair in question. This means, in terms of Bayesian Networks, that there exists an arc between the two states identified by the two pairs.

Based on the information contained in the effect/cause conditional probabilities and in the effect/no_cause conditional probabilities contained in the Useful Probability Group, a Bayesian Network Probability Table for each effect state of the Bayesian Network is computed by the Accountable Agent, each Probability Table containing the probabilities associated with an effect state, i.e., the probabilities $P(E|C_1, C_2, \ldots, C_n)$ of the presence of the effect E for a given configuration of causes $C_1, C_2 \ldots, C_n$.

In particular, each Bayesian Network Probability Table has the following format:

| $C_1$ | $C_2$ | $C_3$ | ... | $C_n$ | $P(E = 0)$ | $P(E = 1)$ |
|---|---|---|---|---|---|---|
| 0 | 0 | 0 | ... | 0 | $P(E = 0 | C_i = 0)$ | $1-P(E = 0)$ |
| 1 | 0 | 0 | ... | 0 | $P(E = 0 | C_1 = 1, C_{(i \ne 1)} = 0)$ | $1-P(E = 0)$ |
| 0 | 1 | 0 | ... | 0 | $P(E = 0 | C_2 = 1, C_{(i \ne 2)} = 0)$ | $1-P(E = 0)$ |
| 0 | 0 | 1 | ... | 0 | $P(E = 0 | C_3 = 1, C_{(i \ne 3)} = 0)$ | $1-P(E = 0)$ |
| ... | ... | ... | ... | ... | ... | ... |
| 0 | 0 | 0 | ... | 1 | $P(E = 0 | C_n = 1, C_{(i \ne n)} = 0)$ | $1-P(E = 0)$ |
| 1 | 1 | 0 | ... | 0 | $P(E = 0 | C_1 = 1, C_2 = 1, C_{(i \ne 1,2)} = 0)$ | $1-P(E = 0)$ |
| 1 | 0 | 1 | ... | 0 | $P(E = 0 | C_1 = 1, C_3 = 1, C_{(i \ne 1,3)} = 0)$ | $1-P(E = 0)$ |
| ... | ... | ... | ... | ... | ... | ... |
| 1 | 1 | 1 | ... | 1 | $P(E = 0 | C_i = 1)$ | $1-P(E = 0)$ |

In particular, the columns designated by $C_1$, $C_2$, $C_3$, $C_n$ represent the cause configuration: "0" indicates that the corresponding cause is not present, while "1" indicates that the cause is present.

The column designated by $P(E=0)$ lists the probabilities that the effects to which the table is associated are absent, given the cause configurations indicated in the columns to its left. The column designated by $P(E=1)$, which is simply equal to $1-P(E=0)$, lists the probabilities that the effects to which the table is associated are present, given the cause configurations indicated in the columns to its left.

In the column designated by $P(E=0)$, probabilities indicated in bold are directly represented by Useful Probabilities, i.e., immediately available for the construction of the Probability Table, whereas the other probabilities are to be computed based on Useful Probabilities as described in the following, since not immediately available for the construction of the Probability Table.

For example, the probability $P(E=0|C_i=0)$ is the conditional probability of an effect (in particular, the probability of the absence of the effect) given no fault, and it is indicated in bold since it is directly represented by a Useful Probability. Similarly, the probabilities of the individual causes, for example $P(E=0|C_1=1,C_{(i \ne 1)}=0)$, are effect/cause conditional probabilities related to the individual causes in question, and therefore they are also indicated in bold.

The other probabilities, generically related to multiple causes (doubles, triples, etc.), are to be computed based on the conditional probabilities of single effects given single causes by means of formulas. As the probabilities are computed and not directly obtainable from the Useful Probabilities, the table entries are not in bold.

The formula used for the computation of a probability related to a double cause $C_m=1$, $C_n=1$, $(C_{i \ne m,n}=0)$ is the following:

$$P(E=0|C_m=1,C_n=1,C_{(i \ne m,n)}=0)==P(E=0|C_m=1,C_{(i \ne m)}=0)*P(E=0|C_n=1,C_{(i \ne n)}=0)$$

i.e. the probability of an effect being absent is equal to the product of the probabilities of the effect being absent for single causes, namely the product of the conditional probabilities that the effect is absent when the single causes involved occur.

In general, given a multiple cause configuration, the probability that the effect is absent is equal to the product of the conditional probabilities that the effect is absent when the single causes occur. In other words, if $C=\{C_1, C_2, C_3, \ldots, C_n\}$ is the set of possible causes and $MC_j=(PC_j, AC_j)$ a generic j-th multiple cause configuration formed by the j-th group of present causes $PC_j \subset C$ (including two or more causes present) and the corresponding j-th group of absent causes $AC_j=C-PC_j$, such probability is:

$$P(E=0|MC_j)=\Pi \text{ (for each } C_i \subset PC_j(P(E=0|C_i=1, C_{(k \ne i)}=0))$$

In the following there will be described with reference to FIGS. 5a, 5b and 5c an example of construction of partial Bayesian Network by the Accountable Agent and a single Contiguous Agent, and of joining of the two partial Bayesian Networks to obtain the Inference (or complete) Bayesian Network.

In particular, FIGS. 5a, 5b and 5c show, respectively, examples of a partial Bayesian Network constructed by the Accountable Agent, of a partial Bayesian Network constructed by the Contiguous Agent, and of an Inference Bayesian Network constructed by the Accountable Agent by combining (merging) the two partial Bayesian Networks shown in FIGS. 5a and 5b. Circles A, B, and C represent respectively faults on the network apparatus managed by the Accountable Agent, on a Silent Resource, and on a network apparatus managed by a Contiguous Agent, and circles D and E represent respectively effects generated by the network apparatus managed by the Accountable Agent, and by the network apparatus managed by the Contiguous Agent. The presence of arcs between a cause state and an effect state means that there is a corresponding effect/cause conditional probability.

In particular, with reference to the construction of the partial Bayesian network shown in FIG. 5a by the Accountable Agent, let's assume that the Accountable Agent has received effects D1, D2 and D5, and that the corresponding conditional probabilities have already been computed.

The first step that is carried out by the Accountable Agent is identifying effect/cause conditional probabilities having an EffectResource-Effect pair equal to an EffectResource-Effect pair relating to an effect received by the Accountable Agent, in the example shown in FIG. 5a the conditional probabilities relating to state pairs A1-D1, A3-D1, A2-D2, B1-D2, C2-D5, and these probabilities are added to the Useful Probability Group (initially void) of the Accountable Agent.

The second step that is carried out by the Accountable Agent is identifying all effect/cause conditional probabilities with a CauseResource-Cause pair equal to a CauseResource-Cause pair in the Useful Probability Group and not previously considered, in the example shown in FIG. 5a the conditional probability associated with the state pair A3-D4, and this conditional probability is added to the Useful Probability Group of the Accountable Agent.

The third step that is carried out by the Accountable Agent is identifying all effect/cause conditional probabilities with an EffectResource-Effect pair equal to an EffectResource-Effect pair in the Useful Probability Group and not previously considered, in the example shown in FIG. 5a the conditional probabilities associated with the state pairs A4-D4 and C1-D4, and these probabilities are added to the Useful Probability Group of the Accountable Agent.

The second and the third steps are then alternately repeated by the Accountable Agent until no additional conditional probability is added to the Useful Probability Group. In the example shown in FIG. 5a, during repetition of the second step the conditional probability associated with the state pair A4-D3 is identified and added to the Useful Probability Group, whereas repetition of the third step no additional conditional probability is identified.

Then, for each effect state the effect/no_cause conditional probability is added to the Useful Probability Group of the Accountable Agent.

The procedure then terminates and the Accountable Agent constructs its own partial Bayesian Network shown in FIG. 5a based on the Useful Probability Group so formed.

A similar procedure is carried out by the Contiguous Agent, which constructs the partial Bayesian Network shown in FIG. 5b, and sends it to the Accountable Agent along with its Useful Probability Group.

Then, the Accountable Agent constructs the Inference Bayesian Network shown in FIG. 5c based on its own partial Bayesian Network and that of the Contiguous Agent. In particular, the Accountable Agent merges together the cause states common to the two partial Bayesian Networks, in the example shown in FIGS. 5a and 5b the cause states A3, B1 e C2, while the effect states are only reproduced because there are no effect states that are in common to both partial Bayesian Networks. The Inference Bayesian Network therefore includes each cause state, each effect state and each arc that is present in at least one of the two partial Bayesian Networks.

The Accountable Agent then computes the Bayesian Network Probability Tables for the effect states based on the effect/cause conditional probabilities and on the effect/no_cause conditional probabilities in the Useful Probabilities Groups of the Accountable Agent and the Contiguous Agent.

Finally, the Accountable Agent associates the cause probabilities with the cause states in the Inference Bayesian Network, thus terminating the construction procedure of the Inference Bayesian Network.

In the following there will be described with reference to FIGS. 6a and 6b and 6c how the inference process may be performed on the Inference Bayesian Network shown in FIG. 5c.

In particular, inference is a process for assessing the probability of each state of a node of the Bayesian Network when information (evidence) on other variables is known. In a Bayesian Network that probabilistically models faults and alarms, each node is a random variable with two possible states: present (P) and absent (A). To (a posteriori) update the distribution of the probability of one or more variables in the domain based on known observation values (evidences), the procedure is the following.

Figure 6A:
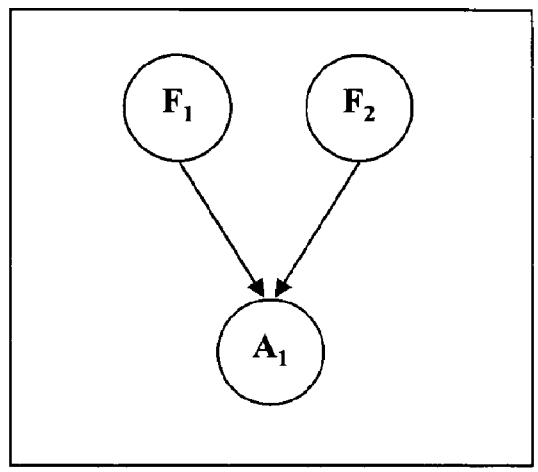
FIGS. 6a and 6b show respectively schematic representations of two elementary Bayesian Networks.

Let's consider the elementary Bayesian Network shown in FIG. 6a, with a single alarm $A_1$ that may be a consequence of one of two possible faults $G_1$ and $G_2$. Assuming that alarm $A_1$ is present, it is possible to introduce the evidence for the node/variable $A_1$ by setting $A_1$=P. Appropriately applying the Bayes' theorem, the probability that alarm $A_1$ is a consequence of the fault $G_1$, i.e., that $G_1$=P, is:

$$P(G_1 = P \mid A_1 = P) = \frac{P(A_1 = P \mid G_1 = P) * P(G_1 = P)}{P(A_1 = P)} =$$

$$= \frac{P(A_1 = P \mid G_1 = P) * P(G_1 = P)}{P(A_1 = P \mid G_1 = P) * P(G_1 = P) + P(A_1 = P \mid G_1 = A) * P(G_1 = A)}$$

The same applies to the fault $G_2$, and hence the probability that $G_2$=P is:

$$P(G_2 = P \mid A_1 = P) = \frac{P(A_1 = P \mid G_2 = P) * P(G_2 = P)}{P(A_1 = P \mid G_2 = P) * P(G_2 = P) + P(A_1 = P \mid G_2 = A) * P(G_2 = A)}$$

Therefore, when alarm $A_1$ is received, the probability that alarm $A_1$ is a consequence of fault $G_1$ or of fault $G_2$ may be computed as described above.

Figure 6B:
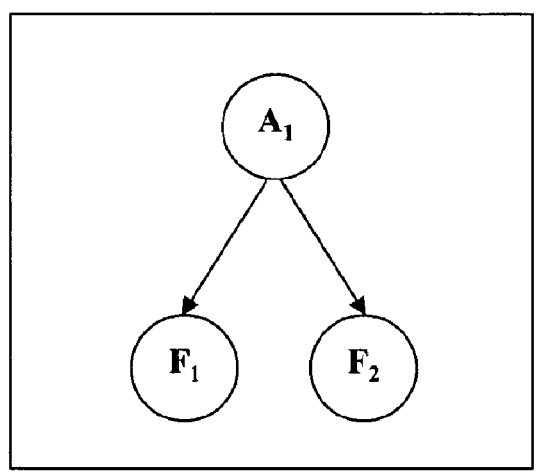

Let's now consider the elementary Bayesian Network shown in FIG. 6b, with a single fault $G_1$ that may generate one of two possible alarms $A_1$ e $A_2$.

Assuming that alarm $A_1$ is present and that alarm $A_2$ is absent, it is possible to introduce the evidences for the nodes/variables $A_1$ and $A_2$ by setting $A_1$=P and $A_1$=A. Appropriately applying the Bayes' theorem and using the dependencies between faults and alarms in the network, the probability that alarm $A_1$ is a consequence of the fault $G_1$, i.e., that $G_1$=P, is:

$$P(G_1 = P \mid A_1 = P, A_2 = A) = \frac{P(A_1 = P, A_2 = A \mid G_1 = P) * P(G_1 = P)}{P(A_1 = P, A_2 = A)} =$$

$$\frac{P(A_1 = P \mid G_1 = P) * P(A_2 = A \mid G_1 = P) * P(G_1 = P)}{P(A_1 = P \mid G_1 = P) * P(A_2 = A \mid G_1 = P) * P(G_1 = P) + P(A_1 = P \mid G_1 = A) * P(A_2 = A \mid G_1 = A) * P(G_1 = A)}$$

Similarly to the two simple Bayesian Networks described above, it is possible to derive a formula for a more complex Bayesian Network as shown in FIG. 5c.

As far as learning of a Bayesian Network is concerned, it may be achieved by using statistical data collected during system operation and information about the effective faults occurred following the hypotheses formulated by the system. The learning function is only performed at the Probability level, therefore working on the base information rather than the constructed Bayesian Network. In particular:

- effects/cause conditional probabilities are updated using statistics of the cases of alarms, events, polled statuses and test results received in association with a single fault detected in the field;
- effect/no_cause conditional probabilities are updated using the statistics of operation cases in which, after receiving alarms, events, polled statuses and test results, no fault has been found in the field; and
- cause probabilities are updated using statistics of the faults detected during operation.

Learning is achieved by using statistical information relating to the CauseResource and EffectResource pair, so as to compute the probabilities based on the topology of the faulty resource and of the resource that detects the fault and to maintain different statistics for different resources in the network and, in this way, to have a particularization of the statistics and of the probabilities for the different resources considered.

Several variants can be applied to the above solution without departing from the scope of the present invention. For example, as previously stated, the method of the present invention can be applied in a centralized manner in a centralized network architecture. A centralized entity will in this case collect the alarms coming from the network so as to elect, for each fault, the accountable apparatus and define the required Bayesian Networks by using the probabilities information.

The invention claimed is:

1. A method for locating a fault in a network, or in a communication network, comprising:
   receiving status information relating to at least an alarm, an event, a polled status or a test result in the network;
   identifying a limited region of the network in which the fault has occurred based on the received status information;
   constructing a probabilistic model relating possible faults and status information in the identified limited region; and
   locating the fault based on the constructed probabilistic model and on the received status information, wherein constructing a probabilistic model comprises:
   for each possible fault in the identified limited region, determining a first probability that a status information is generated when the fault occurs;
   for each possible status information in the identified limited region, determining a second probability that the status information is generated when no fault occurs in the identified limited region; and
   constructing the probabilistic model relating faults and status information in the identified limited region based on the determined first and second probabilities.

2. The method of claim 1, wherein the probabilistic model is based on a Bayesian network.

3. The method of claim 1, wherein the identified limited region is formed by a network apparatus and network apparatuses and resources physically or logically contiguous thereto.

4. The method of claim 1, wherein identifying the limited region is also based on topological and functional information relating to network apparatuses that have generated the status information.

5. The method of claim 1, wherein determining first probabilities comprises:
   identifying the first probabilities associated with the status information received;
   identifying the first probabilities associated with first faults that could have generated the status information received;
   identifying the first probabilities associated with additional status information that could have been generated when the first faults occur; and
   identifying the first probabilities associated with second faults that could have generated the additional status information received.

6. The method of claim 5, wherein determining first probabilities further comprises:
   repeating identifying the first probabilities associated with additional status information that could have been generated when the first faults occur, and identifying the first probabilities associated with second faults that could have generated the additional status information received, until no further first probability is identified.

7. The method of claim 1, wherein constructing a probabilistic model further comprises:
   for each individual possible fault in the identified limited region, determining a third probability that the individual possible fault occurs in the identified limited region.

8. The method of claim 1, wherein constructing a probabilistic model further comprises:
   determining fourth probabilities that given status information is generated when given multiple faults occur within the identified limited region.

9. The method of claim 8, wherein determining fourth probabilities comprises:
   determining the fourth probabilities based on the first probabilities that the given status information is generated when the corresponding individual faults occur.

10. The method of claim 1, wherein locating the fault comprises:
    inferring the fault location based on the constructed probabilistic model and on status information received from the identified limited region of the network.

11. The method of claim 1, wherein the network is a distributed-agent communication network.

12. The method of claim 1, wherein identifying the limited region comprises:
    identifying an accountable network resource responsible for the management of the fault;
    identifying at least one network resource physically or logically contiguous to the accountable network resource; and
    identifying at least one network resource physically or logically interconnecting the accountable network resource and a contiguous network resource.

13. The method of claim 12, wherein the network is a distributed-agent communication network comprising a number of network resources each managed by an agent, and wherein identifying the limited region comprises:
    identifying an accountable agent associated with the accountable network resource; and
    identifying at least one contiguous agent associated with the accountable network resource.

14. The method of claim 13, wherein identifying an accountable agent comprises:
    identifying an agent having the most information relating to the fault in the limited region.

15. The method of claim 13, wherein constructing the probabilistic model further comprises:
    constructing by the accountable agent a partial probabilistic model relating status information received by the accountable agent and faults occurred in the accountable network resource, in the contiguous network resource and in an interconnection resource;
    constructing by the contiguous agent a partial probabilistic model relating status information received by the contiguous agent and faults occurred in the accountable network resource, in the contiguous network resource and in the interconnection resource; and
    constructing by the accountable agent the probabilistic model relating faults and status information in the identified limited region based on the partial probabilistic models constructed by the accountable agent and the contiguous agent.

16. The method of claim 15, wherein constructing the probabilistic model comprises:
    combining the partial probabilistic models constructed by the accountable agent and the contiguous agent.

17. The method of claim 15,
    wherein constructing a partial probabilistic model by an agent comprises:

for each individual possible fault in the accountable network resource, in the contiguous network resource and in the interconnection resource, determining a first probability that status information is generated when the individual fault occurs;

for each status information that may be generated by the network resource managed by the agent, determining a second probability that the status information is generated when no fault occurs in the network resource managed by the agent; and constructing the partial probabilistic model based on the determined first and second probabilities.

18. The method of claim 17, wherein determining first probabilities comprises:

identifying the first probabilities associated with the status information received by the agent;

identifying the first probabilities associated with first faults that could have generated the status information received by the agent;

identifying the first probabilities associated with additional status information that could have been generated when the first faults occur; and identifying the first probabilities associated with second faults that could have generated the additional status information received by the agent.

19. The method of claim 18, wherein determining first probabilities further comprises:

repeating identifying the first probabilities associated with additional status information that could have been generated when the first faults occur, and identifying the first probabilities associated with second faults that could have generated the additional status information received by the agent, until no further first probability is identified.

20. The method of claim 17, wherein constructing a partial probabilistic model by an agent further comprises:

for each individual possible fault in network resource managed by the agent, determining a third probability that the individual fault occurs in the network resource managed by the agent.

21. The method of claim 17, wherein constructing a partial probabilistic model by an agent further comprises:

determining fourth probabilities that given status information is generated when given multiple faults occur in network resource managed by the agent.

22. The method of claim 21, wherein determining fourth probabilities that given status information is generated when given multiple faults occur in network resource managed by the agent comprises:

determining the fourth probabilities based on the first probabilities that the status information is generated when the corresponding individual faults occur in network resource managed by the agent.

23. The method of claim 12, wherein identifying at least one network resource physically or logically contiguous to the accountable network resource comprises:

identifying the network resource which is physically or logically contiguous to the accountable network resource having an agent which has information relating to the fault in the limited region useful for fault identification.

24. A system for locating a fault in a network or a communication network, comprising a configuration capable of performing the method of claim 1.

25. The system of claim 24, wherein the network is a distributed-agent communication network comprising a number of network resources each managed by an agent, the agents comprising a configuration capable of performing said method.

26. A non-transitory computer readable medium encoded with a computer program product loadable into a memory of a fault locating system in a network and comprising software-code portions for performing the method of claim 1 when the software product is run on a fault processing system.

27. A method for constructing a probabilistic model relating faults and status information in a network comprising locating a fault in the network according to the method of claim 1.

* * * * *